Sept. 28, 1965　　　　P. A. INKLAAR　　　　3,208,900
METHOD OF MANUFACTURING DECORATED MOLDED ARTICLES
FROM FINELY DIVIDED THERMOPLASTIC MATERIALS
Filed Nov. 21, 1961
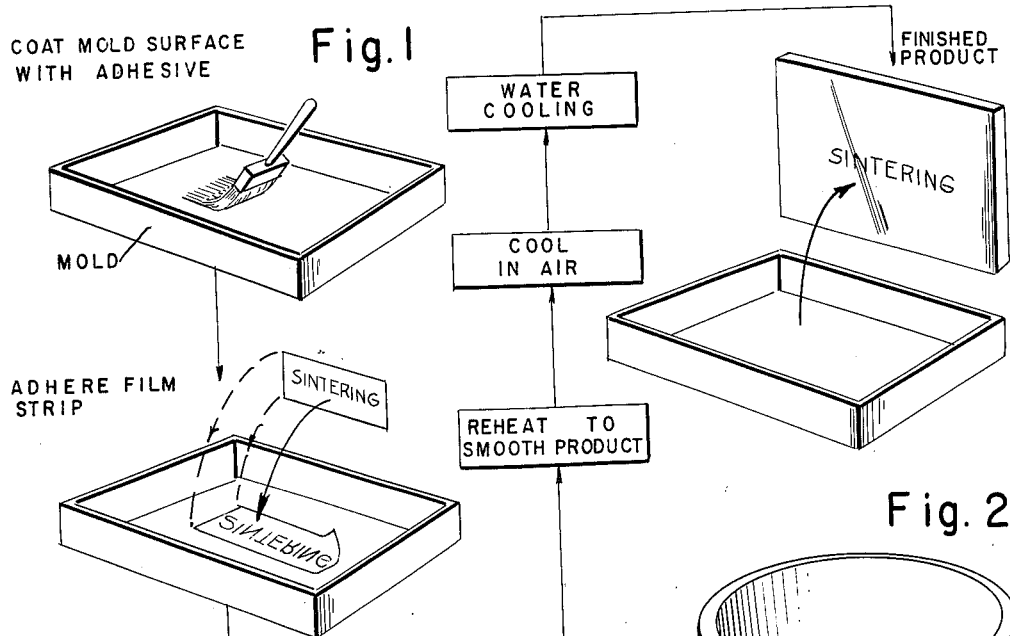
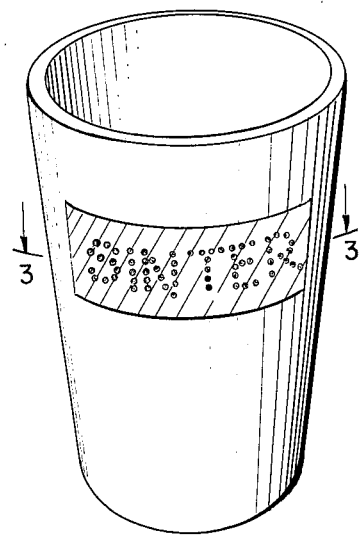
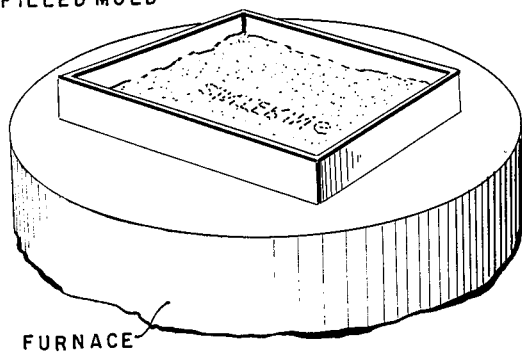
INVENTOR.
PETRUS ADAM INKLAAR
BY Albert C. Johnston
ATTORNEY

United States Patent Office 3,208,900
Patented Sept. 28, 1965

---

3,208,900
METHOD OF MANUFACTURING DECORATED MOLDED ARTICLES FROM FINELY DIVIDED THERMOPLASTIC MATERIALS
Petrus Adam Inklaar, Diepenveen, Netherlands, assignor to Vasco Industries Corp., New York, N.Y., a corporation of New York
Filed Nov. 21, 1961, Ser. No. 154,038
Claims priority, application Netherlands, Nov. 25, 1960, 258,415
18 Claims. (Cl. 161—5)

This invention relates to a method of manufacturing from powdered thermoplastic materials molded articles which have integrally formed in their walls colored or non-colored pictures, ornamentations, letters or wordings, herein referred to generally as decorations.

According to a method often referred to as the powder sintering process, a powdered or otherwise finely divided thermoplastic material, for example, polyethylene, is placed in a hollow mold in a quantity such that an inner surface of the mold wall, having the configuration of the article to be produced, may be entirely covered with a layer of the material of a sufficient thickness to form by sintering the desired wall thickness of the article. While being charged with the material, the mold wall is at a temperature insufficient to cause the particles of plastic material to sinter. Then the mold wall is heated in such manner, as to temperature, time and other conditions, that the particles of the plastic material sinter together on the molding surface to form thereon a coherent self-sustaining layer of the desired thickness. Then the mold is cooled and the article is removed from it.

In the known practices of that process, decorations or indicia such as pictures, ornamentations or wordings are applied to the articles, as by printing them on, after the articles are molded. The application of decorations to the finished articles is, however, very time-consuming and expensive. One reason for this is that the molded surfaces of the thermoplastic material generally require a special pretreatment in order to retain matter printed on them. Another is that since the surfaces of the molded articles are often curved or arched, the printing of decorations on them frequently requires the use of special equipment.

It has now been found that thermoplastic articles having decorations integrally united with their molded walls can be manufactured according to the powder sintering process by a method in which a decorative film or layer of a plastic material capable, at a temperature within the melting range of the thermoplastic material from which the desired articles is to be molded, of forming a physical or chemical bond with such thermoplastic material, and provided with a desired design, lettering, ornamentation or the like, is placed against the inner surface of the mold in which the article is to be produced, after which the thermoplastic article is produced in the mold at a temperature which is sufficient to effect concurrently the sintering of the thermoplastic powder into a wall forming the article and the bonding of the decorative film or layer into that wall.

According to the invention, articles of sintered thermoplastic material carrying the desired decorations can be manufactured in a single operation. For this purpose, first a film material is selected which is most suitable for the end in view as regards kind, color, and thickness and which meets the condition of fusing or otherwise forming an integral bond or connection with the thermoplastic material from which the article is to be manufactured, at the temperature used for sintering the latter. On strips of the type of film selected, the decoration is provided in the manner, size and color or colors desired. Before the sintering, the film strips are adapted in shape and size to the end in view and to the size and the shape of the mold in which the article is to be produced.

A suitably selected film strip is then adhered against the inner surface of the mold, with either a decorated or an undecorated surface of the film facing said wall surface, as may be preferred, after which the desired article is produced at the normal processing temperature from thermoplastic powder placed in the mold, and the finished article is removed from the mold, if desired, after cooling.

The adhering of the film against the molding surface may be effected without adhesives if the film is sufficiently thin and the mold surface is polished. In many cases, however, it is to be preferred to use an adhesive to attach the film.

The adhesives suitable are substances or mixtures which fulfill the several requirements of withstanding the sintering temperature at which the article of thermoplastic material is produced, of holding the decorative film immovably and smoothly against the inner surface of the mold both at the beginning of and during the sintering process, and yet of having little or no tendency to hold the molded article in adhesion to the same surface after the article is formed.

It has been found that the known silicone oils and silicone greases serve very well as adhesives which meet the requirements.

Useful in addition are solid hydrocarbons, or pasty mixtures of solid and liquid hydrocarbons, which are miscible with a liquid monomer or oligomer of the processed plastic materials and may be processed with them to a smooth paste, or liquid hydrocarbons or mixtures thereof which are miscible with the processed plastic materials and may be processed with one or both of them to a pasty mass that meets the above requirements.

For adhering decorative polyethylene films against the inner surface of the mold, as in the production of decorated polyethylene articles, a mixture of a major proportion, e.g., 100 parts by weight, of paraffin oil and a minor proportion, e.g., 20 parts, of high-pressure polyethylene having, for example, a melting index of 20, has been found to be especially suitable. This adhesive also gives good results when processing polyvinylchloride films, polyvinylidene chloride films and polyamide films.

If desired, the decorative film used according to the invention can itself be formed directly on the inner surface of the mold. For example, one or more colored thermoplastic powders may be strewn, whether or not according to a definite pattern or design, on the bottom surface of the mold cavity, or a decoration may be painted on the bottom or other inner surface with suitably temperature-resistant ink, after which a thin layer of thermoplastic powder is provided over the decoration on the mold surface. The mold is then heated until the thermoplastic powder is fused into an uninterrupted thin layer. Then it is cooled, and then the desired article is produced in the mold. In order to form a decorative film e.g., one made of colored thermoplastic powders, against the side or other walls of a mold, these walls may first be painted with an adhesive of the character described.

According to another practice, a thermoplastic film can be placed or formed directly against the mold surface, after which the colored powders may be strewn over this film at a time when it has been made sticky by the heating of the mold or when it continues to be sticky as a result of heating used to form it in the mold.

The thickness of the decorative film to be used depends in some cases upon the material from which the film is made. Films may be used which are composed of several layers of the same kind of plastic material or of different plastic materials, or of a plastic material having a metallic layer formed thereon either as a film or by spraying.

The film in some cases is adhered to the mold surface with its decorated or printed surface facing the wall.

In other cases, use is made of a suitably transparent film material of suitable thickness which is imprinted or painted on one side with a suitably colored substance, and the decorated side of the film is faced away from the mold wall. A desired picture or wording can thus be displayed clearly on the wall of the molded article, even though the picture or wording is covered by a thin layer of plastic material integrally bonded with the wall of the article. In this practice, the picture or wording is preferably provided as a mirror image thereof on the surface of the film strip.

It is thus possible, according to the invention, to produce in one operation molded articles of thermoplastic material carrying a wording, design or other decoration or indicia that is permanently protected from weather influences and chemical or mechanical damage by a thin layer of plastic material constituting an integrally bonded part of the finished article.

A polyethylene film decorated or marked by means of known heat-resistant ink and attached in the desired position against the inner surface of the mold in accordance with the invention is entirely incorporated in the wall of the manufactured article and forms a unit with it, and the decoration or marking is united with the wall of the article in an entirely undamaged manner, without distortion or mis-shaping, in the position where the film engaged the wall of the mold.

Temperature resistance is the most important property to be possessed by the inks used for printing or coloring the film strips. The so-called "steam set" printing inks, of which several varieties are commercially available, have been found well suited for printing on films to be used in the method according to the invention. These inks are usually made with drying oil or resin oil vehicles which frequently contain drying agents.

The method according to the invention is very suitable for producing molded articles of thermoplastic material colored on their outer surface or having a thin metallic layer on that surface. For this purpose, a colored plastic film or a film coated with a layer of metallic composition is provided on the whole inner surface of the mold, in the latter case with the metallic layer facing the mold surface, and then the article of thermoplastic material is manufactured in the mold. In this way, for example, large containers can be produced economically with a colorless or white inner surface and a colored outer surface, or vice versa.

It is sometimes advantageous to use a film strip of larger area than is strictly necessary for presenting the desired design, wording, or the like, so as to obtain a better attachment of the film against the wall of the mold during the manufacture of the article of plastic material and thus to prevent distortion or mis-shaping.

With the method according to the invention, several color effects can be obtained in a single product. For example, the article of plastic material may be given a color different from that of the film, and a desired wording or picture may be punched in the film.

The practice of the invention is further represented by and will be more fully evident from the following illustrative examples and from the accompanying drawing in which:

FIG. 1 illustrates diagrammatically the steps of the method as described in Example I and the resulting article, and FIGS. 2 and 3 are, respectively, a diagrammatic perspective view and an enlarged fragmentary cross sectional view of a molded article of the construction obtained according to Example II, VII or IX.

EXAMPLE I

The entirely dry inside wall surfaces of a sheet steel tray, 20 cm. long, 15 cm. wide and 5 cm. high, were evenly painted by means of a brush with a silicone oil (Bayer M 100). The bottom of this tray was then overlaid by a transparent film strip, 8 cm. wide, 5 cm. long and 0.075 mm. thick, made from high-pressure polyethylene. This strip carried a thoroughly dried wording in mirror image, printed with a red "steam set" ink obtainable commercially and capable of withstanding a temperature of approximately 350° C. The strip was pressed carefully, firmly and entirely smoothly against the wall of the tray, for example by means of a wadding, with the unprinted side facing the wall. After pressing, no air bubbles could be seen with the naked eye between the strip and the wall.

Now the tray was filled with 250 g. of polyethylene powder having a melting index of 2, a specific gravity of 0.919 and a maximum grain size of 0.4 mm. The powder was evenly distributed in the tray and slightly compressed. Then the tray was placed over the shaft opening of an electric furnace having a temperature of 350° C., so that the tray entirely covered the furnace opening. After 10 minutes, the tray was removed from the furnace and the non-melted powder shaken out of the tray. Then the tray was placed on the furnace for another 8 minutes, by which time the sintered plastic mass had become transparent. The tray was then allowed to cool in the open air for 4 minutes, then held for a moment in a water bath of room temperature and then immersed entirely in the water bath.

The resulting product was a polyethylene plate formed with an integrally incorporated decorative film which legibly displays the selected wording from its under side through the transparent film. The product was easily removed from the tray.

EXAMPLE II

As a mold there was used a round, conically tapering container made of heat-resistant glass with a height of 16 cm., a bottom diameter of 10 cm. and a top diameter of 13 cm.

A strip of red low-pressure polyethylene film, 6.5 cm. long, 6 cm. wide and 0.05 mm. thick, having a decoration punched in it, was laid evenly and smoothened over its whole area, by hand, against the inside of the tapered mold wall.

Then the container was filled to the brim with yellow low-pressure polyethylene powder having a melting index of 7. The powder was slightly compressed and the container was suspended to its brim for 7 minutes in an electric furnace having a temperature of 275° C. Then the non-sintered powder was shaken out and the container was once again suspended for 3 minutes in the furnace in the same manner. The assembly was then allowed to cool in the open air for 3 minutes, then suspended to the brim in water of 22° C. for 2 to 3 minutes and then immersed in the water.

Finally, a conical polyethylene container having the decoration sintered in its side wall in yellow and red was removed from the glass mold.

EXAMPLE III

As a mold there was used a round, conically tapering sheet steel container having a height of 16 cm., a bottom diameter of 10 cm. and a top diameter of 13 cm.

At the location where indicia were desired on the wall of the article to be molded, the inner wall surface of the metal container was painted over an area of approximately 8 x 8 cm., by means of a brush, with an adhesive consisting of a mixture of monostyrene and polystyrene. This mixture was obtained by mixing, with thorough stirring, 10 ml. of liquid monostyrene with so much solid polystyrene that the volume of the mixture was 15 ml.

Over the part of the mold surface covered with the adhesive, a 6 x 6 cm. strip of blue polystyrene film having indicia printed on one side thereof in yellow "steam set" printing ink, so as to cover approximately 2 x 2 cm. of its surface, was adhered thoroughly with its printed side facing the mold surface. The thickness of the film strip was 0.06 mm.

The sheet steel container was then filled to the brim with polystyrene powder and the powder was slightly compressed. The further treatment was effected as described in Example II, with the use of a furnace temperature of approximately 350° C., and a sintering time of 10 minutes.

EXAMPLE IV

The inside surface of the side wall of a sheet steel container having dimensions as described in Example III was covered over an area corresponding to the size of a desired decoration of the article to be molded with an adhesive consisting of a mixture of paraffin oil and polyethylene having a melting index of 20. This mixture was obtained by heating 100 ml. of paraffin oil to approximately 170° C. and homogeneously mixing in it 15 g. of polyethylene.

Over the part of the surface covered with the adhesive, a strip of transparent laminated thermoplastic film composed of three layers was applied in a completely smooth manner. Air bubbles, if any, were brushed or pressed away. The film strip consisted of two layers of polyethylene adhered to an intermediate layer of nylon 11 having indicia printed thereon with "steam set" ink. The film strip was arranged with its printed surface facing the mold wall. Its thickness was 0.35 mm.

The layers of the film strip may also be applied one after another in superimposed relation against the mold wall, with the use of an adhesive, such as the above-mentioned paraffin oil-polyethylene mixture, between the layers.

The sheet steel container was then filled to the brim with polyethylene powder having a melting index of 7, after which sintering was carried out as described in Example II with the use of a sintering temperature of approximately 350° C. and a sintering time of 7 minutes.

EXAMPLE V

The production of a molded article of thermoplastic material was carried out by the use of a mold and procedures as described in Example III.

In the present example, however, the adhesive used was a silicone grease; the film strip used was a strip of cellulose-acetobutyrate film metallized with aluminum dust and weighing 72 g./m.$^2$, in which film a wording was punched; and the article was produced from cellulose-acetobutyrate powder with the use of a sintering temperature of approximately 300° C. and a sintering time of 8 minutes.

EXAMPLE VI

An article was again produced by use of a mold and procedures as described in Example III, but with different materials.

The adhesive used was a mixture of paraffin oil and polyethylene as described in Example IV.

The decorative film was formed by use of a strip of polypropene film (melting index 10) having a thickness of 0.05 mm. and a strip of aluminum foil 0.05 mm. thick having indicia punched in the foil strip. The polypropene film was adhered to the wall of the sheet steel container, and the aluminum foil was adhered over the polypropene film.

The article was manufactured from high-pressure polyethylene powder having a melting index of 7, with the use of a sintering temperature of approximately 300° C. and a sintering time of 5 minutes.

EXAMPLE VII

A mold and procedures as described in Example III were used with an adhesive mixture of paraffin oil and polyethylene as described in Example IV.

The decorative film used was a strip of polyethylene film, 0.03 mm. thick, having indicia punched in the strip. This film strip was laid around the whole side wall of the sheet steel container so as to cover its entire upright molding surface.

The article was molded from a powdered polymer of 11-aminoundecanic acid (nylon 11), with the use of a sintering temperature of approximately 200° C. and a sintering time of 7 minutes.

EXAMPLE VIII

A mold and procedures as described in Example III were used with an adhesive mixture of paraffin oil and polyethylene as described in Example IV.

The decorative film used was a strip of transparent film, 0.08 mm. thick, composed of a copolymer of 85% vinylidene chloride and 15% vinyl chloride and printed on one side in mirror image with "steam set" ink. The film strip was adhered with its unprinted side against the mold wall.

The article was molded from a powder composed of the same copolymer as the film strip, with the use of a sintering temperature of approximately 165° C. and a sintering time of 12 minutes.

EXAMPLE IX

A mold and procedures as described in Example III were again used with an adhesive mixture as described in Example IV.

As the film strip there was used a piece of colored terephthalic acid polyglycol ester film, 0.08 mm. thick, having indicia punched in the strip The article was molded from low-pressure polyethylene having a melting index of 12, with the use of a sintering temperature of approximately 300° C. and a sintering time of 10 minutes.

EXAMPLE X

A mold was used as described in Example III, but the decorative film was formed in situ on the mold wall.

Upon the wall surface of the sheet steel container, previously covered with the adhesive described in Example IV, a decoration formed of different colors of "steam set" inks was painted by means of a brush. Over the colored inks a thin layer of pulverized high-pressure polyethylene was strewn, whereupon the container was heated until the polyethylene powder had fused into a closed layer. Then the container was allowed to cool, for example, in the open air, and then it was filled to the brim with high-pressure polyethylene powder having a melting index of 20. The powder was slightly compressed, and then the molding was effected as described in Example II but with the use of a furnace temperature of 350° C. and a sintering time of 10 minutes.

I claim:

1. A method of producing a molded decorated laminar article from a powdered thermoplastic material, which comprises providing a hollow mold formed by a heat-transmitting wall the inner surface of which has the configuration of the article to be produced, supporting evenly over at least part of said surface a film adapted for decoration of said article and composed, at least over one of its sides, of a plastic material capable of fusing at a temperature to which said wall is to be heated for the ensuing sintering of said powdered material, placing in the mold over said film a quantity of said powdered thermoplastic material at least sufficient to form by sintering of its particles a coherent self-sustaining layer covering said surface, and, by heating said wall and transmitting heat from said surface and through said film to said powdered thermoplastic material, heating particles of said powdered material near to said surface, including the particles next to said film, to a temperature within their melting range and sintering the heated particles together and to said film until they have been formed into a layer as aforesaid having said film bonded integrally thereinto.

2. A method as claimed in claim 1, said film being composed as aforesaid of a thermoplastic material having essentially the same composition as said finely divided thermoplastic material.

3. A method as claimed in claim 1, said thermoplastic material being a finely divided polyethylene, said film being a polyethylene film carrying a decoration for said article on one of its sides.

4. A method as claimed in claim 1, said film having indicia printed thereon in a colored composition that is non-volatile and resistant to decomposition at said temperature.

5. A method as claimed in claim 1, said film and said finely divided thermoplastic material being of contrasting colors, said film having perforations formed therein in the pattern of indicia desired on said article.

6. A method as claimed in claim 1, said film being transparent and having a mirror image of desired indicia printed on one of its sides, and being supported in the mold with its other side facing said surface.

7. A method as claimed in claim 1, said film having indicia printed on a surface thereof in a colored composition that is non-volatile and resistant to decomposition at said temperature to which said wall is to be heated, and being supported in the mold with its printed surface facing said mold wall surface.

8. A method as claimed in claim 1, said film being formed in situ on said surface by applying to said surface a decoration of differently colored compositions which are non-volatile, fusible and resistant to decomposition at said temperature to which said wall is to be heated, covering said decoration with a thin layer of finely divided thermoplastic material, and heating said mold wall until the particles of said thin layer and said decoration are fused together into a coherent film.

9. A method as claimed in claim 1, said film being adhered to said surface by a liquid to pasty adhesive composition that is non-volatile and resistant to decomposition at said temperature to which said wall is to be heated but which becomes bonded into the material of said film and loses adhesion to said surface during said heating.

10. A method as claimed in claim 9, said adhesive composition being a silicone lubricant.

11. A method as claimed in claim 1, said powdered thermoplastic material next to said film being kept slightly compressed during said heating.

12. A method as claimed in claim 1, the quantity of said powdered thermoplastic material placed in the mold being greatly in excess of that required to form said layer, said powdered material next to said film being kept slightly compressed during said heating, by the weight of the excess of powdered material in the mold.

13. A molded article consisting of a self-sustaining impervious laminar wall forming the body including the inner and outer surfaces of the article and composed of a film of pliable thermoplastic material, one side of which lies in its entirety at and constitutes at least part of said outer surface, and a relatively thick impervious layer of thermoplastic material composed of thermoplastic particles integrally sintered together and to the material of said film over the entire area of the other side of said film, said wall presenting from the interface of said film and said layer a decoration integral therewith that is visually prominent at said outer surface and there being no joint apparent to the eye between said film and said layer.

14. A molded article according to claim 13, said film being composed of a thermoplastic material that melts at approximately the same temperature as the material forming said layer.

15. A molded article according to claim 13, said film and said layer being each composed essentially of a polyethylene.

16. A molded article consisting of a self-sustaining impervious laminar wall forming the body including the inner and outer surfaces of the article and composed of a film of pliable thermoplastic material, one side of which lies in its entirety at and constitutes at least part of said outer surface, and a relatively thick impervious layer of thermoplastic material composed of thermoplastic particles integrally sintered together and to the material of said film over the entire area of the other side of said film, said wall presenting from the interface of said film and said layer a decoration integral therewith that is visually prominent at said outer surface and there being no joint apparent to the eye between said film and said layer, said film and said layer having contrasting colors and said decoration comprising perforations in said film filled with the material of said layer.

17. A molded article consisting of a self-sustaining impervious laminar wall forming the body including the inner and outer surfaces of the article and composed of a film of pliable thermoplastic material, one side of which lies in its entirety at and constitutes at least part of said outer surface, and a relatively thick impervious layer of thermoplastic material composed of thermoplastic particles integrally sintered together and to the material of said film over the entire area of the other side of said film, said wall presenting from the interface of said film and said layer a decoration integral therewith that is visually prominent at said outer surface and there being no joint apparent to the eye between said film and said layer, said film being transparent and said decoration comprising colored matter forming a mirror image of desired indicia on the inner side of said film at the junction thereof with said layer.

18. A molded article consisting of a self-sustaining impervious laminar wall forming the body including the inner and outer surfaces of the article and composed of a film of polyethylene, one side of which lies in its entirety at and constitutes at least part of said outer surface, and a relatively thick impervious layer composed of polyethylene particles integrally sintered together and to the material of said film over the entire area of the other side of said film, said wall presenting from the interface of said film and said layer a decoration integral therewith that is visually prominent at said outer surface and there being no joint apparent to the eye between said film and said layer, said film being transparent and said decoration comprising colored matter forming a mirror image of desired indicia on the inner side of said film at the junction thereof with said layer.

(References on following page)

References Cited by the Examiner

UNITED STATES PATENTS

| | | | |
|---|---|---|---|
| 334,786 | 1/86 | Bau | 264—247 |
| 2,250,958 | 7/41 | Kautter et al. | 18—60 |
| 2,250,958 | 7/41 | Kautter | 264—247 |
| 2,273,700 | 2/42 | Feuerstein | 264—245 |
| 2,619,679 | 12/52 | Baldanza | 264—247 |
| 2,619,753 | 12/52 | Lurce | 264—248 |
| 2,677,867 | 5/54 | Aguirre-Gonzalo et al. | 18—47 X |
| 2,749,640 | 6/56 | Scott | 264—248 |
| 2,761,177 | 9/56 | Walters | 264—126 |
| 2,765,248 | 10/56 | Beech et al. | 18—47 X |
| 2,781,553 | 2/57 | Varela | 18—60 |
| 2,962,409 | 11/60 | Ludlow et al. | 264—259 |
| 3,000,754 | 9/61 | Zentmyer | 161—6 |
| 3,060,610 | 10/62 | Stangl | 161—6 |
| 3,077,638 | 2/63 | Hickam | 264—259 |
| 3,122,598 | 2/64 | Berger | 264—247 |
| 3,125,484 | 3/64 | Weiss | 161—6 |
| 3,134,830 | 5/64 | Roelen | 264—248 |

FOREIGN PATENTS

| | | |
|---|---|---|
| 167,676 | 5/56 | Australia. |

ROBERT F. WHITE, *Primary Examiner.*

WILLIAM J. STEPHENSON, ALEXANDER H. BRODMERKEL, *Examiners.*